United States Patent
Minemura et al.

(10) Patent No.: US 6,746,760 B2
(45) Date of Patent: Jun. 8, 2004

(54) GAS ADSORPTION SHEET AND AIR-PURIFYING FILTER

(75) Inventors: Shinichi Minemura, Shiga (JP); Masayuki Imagawa, Shiga (JP)

(73) Assignee: Toyobo Co., LTD, Osaka (JP)

( * ) Notice: Subject to any disclaimer, the term of this patent is extended or adjusted under 35 U.S.C. 154(b) by 195 days.

(21) Appl. No.: 09/925,687

(22) Filed: Aug. 10, 2001

(65) Prior Publication Data

US 2003/0207635 A1 Nov. 6, 2003

Related U.S. Application Data

(62) Division of application No. 09/305,100, filed on May 5, 1999.

(30) Foreign Application Priority Data

| May 8, 1998 | (JP) | ............................................ | 10-125513 |
| Oct. 9, 1998 | (JP) | ............................................ | 10-288361 |
| Oct. 9, 1998 | (JP) | ............................................ | 10-288362 |
| Nov. 30, 1998 | (JP) | ............................................ | 10-339865 |
| Dec. 4, 1998 | (JP) | ............................................ | 10-345507 |

(51) Int. Cl.[7] .............................. B32B 5/16; D04H 1/00; D04H 13/00

(52) U.S. Cl. .................... 428/323; 428/304.4; 442/340; 442/341; 442/344; 442/346; 442/350; 442/381; 442/389; 442/394; 442/414; 442/415; 442/417

(58) Field of Search .............................. 428/304.4, 323; 442/340, 341, 344, 346, 350, 381, 389, 394, 414, 415, 417

(56) References Cited

U.S. PATENT DOCUMENTS

| 5,605,746 A | 2/1997 | Groeger et al. | ............. | 442/347 |
| 5,674,339 A | 10/1997 | Groeger et al. | ............. | 156/145 |
| 5,732,718 A | * 3/1998 | Douglas et al. | ............. | 131/342 |

FOREIGN PATENT DOCUMENTS

| JP | 48 72088 | 9/1973 |
| JP | 4-74505 | 3/1992 |
| JP | 4-35201 | 6/1992 |
| JP | 7-265640 | 10/1995 |
| JP | 9-285531 | 11/1997 |
| WO | WO 94/11556 | 5/1994 |

OTHER PUBLICATIONS

Database WPI Section Ch, Week 9027 Derwent Publications Ltd., London, GB; AN 90–204849 XP 002111575 & JP 02 135141 A (Toyobo KK), May 24, 1990 *abstract*.
Database WPI Section Ch, Week 9514 Derwent Publications Ltd., London, GB; AN 95–102332 XP 00211576 & JP 07 026450 A (Mitsubishi Paper Mills Ltd), Jan. 27, 1995 *abstract*.
Patent Abstracts of Japan vol. 097, No. 002, Feb. 28, 1997 & JP 08 281030 A (Toyobo Co Ltd), Oct. 29, 1996 *abstract*.
Patent Abstracts of Japan vol. 098, No. 010, Aug. 31, 1998 & JP 10 128109 A (Toyobo Co Ltd), May 19, 1998 *abstract*.

* cited by examiner

*Primary Examiner*—Arti R. Singh
*Assistant Examiner*—Christopher Pratt
(74) *Attorney, Agent, or Firm*—Morrison & Foerster LLP

(57) ABSTRACT

The gas adsorption sheet of the present invention has a granular activated carbon-containing sheet comprising a granular activated carbon having an average particle diameter of 60 to 600 µm, a supporting fiber for fixing the granular activated carbon in contact with it, and an adhesive fiber which mainly contributes to shape retention. An air-purifying filter of the present invention is obtained by forming the gas adsorption sheet into a shape of pleats or wave. A method for producing a gas adsorption sheet of the present invention comprises a step of forming a granular activated carbon-containing sheet by using an aqueous slurry containing a granular activated carbon, a supporting fiber and a water-swelling adhesive fiber.

13 Claims, 2 Drawing Sheets

AIR FLOW

AIR FLOW

GAS ADSORPTION SHEET AND AIR-PURIFYING FILTER

This application is a division of Ser. No. 09/305,100, filed May 5, 1999.

BACKGROUND OF THE INVENTION

1. Field of the Invention

The present invention relates to a gas adsorption sheet having a deodorizing function and an air-purifying filter having a dust-removing function and a deodorizing function, and relates to a method for producing the gas adsorption sheet.

2. Description of the Related Art

Heretofore, a granular activated carbon has generally been used for purification or deodorizing of a gas or liquid because of its cheap price, good air permeability and strong adsorbability for a solute in an aerosol or solution.

As one of techniques of applying such a granular activated carbon to an air-purifying filter, there is a sheet-like adsorption material to be used by passing an air to be purified through the sheet in a direction perpendicular to the sheet surface. However, it is not easy to form into a filter by using the granular activated carbon alone in such a sheet-like adsorption material. Even if the filter could be formed by using some carrier, there arises a problem that the granular activated carbon is easily released and lost from the carrier. Under these circumstances, it has been required to develop a technique capable of effectively using the above granular activated carbon as a raw material of the air-purifying filter.

On the other hand, with the increase of a problem about dust contamination, there has been required an air-purifying filter comprising a filter having a dust-removing function and a filter having a deodorizing function in combination. However, in the configuration wherein a dust-removing filter and a deodorizing filter are separately provided, there was a problem about the space or a problem that the cost is liable to become higher.

As a technique of effectively using the granular activated carbon as a raw material of the air-purifying filter, there is known a method of carrying an activated carbon with a non-woven fabric, a net-like substrate or polyurethane foam at present.

For example, JP-A-48-72088 discloses a gas adsorption sheet obtained by applying an adhesive on a non-woven sheet and distributing an activated carbon thereon. However, in the case of such a gas adsorption sheet, when the activated carbon strongly fixed is required, the pore surface of the non-woven fabric must be coated with a large amount of the adhesive. As a result, the air permeation resistance becomes higher and there was a problem that early clogging is liable to be caused by comparatively coarse powders such as pollen, sand dust, spike dust and the like.

JP-A-9-285531 discloses a gas adsorption sheet obtained by coating a binder on a net-like substrate to reduce pressure loss and then carrying an activated carbon, while JP-B-4-35201 discloses a gas adsorption sheet obtained by coating a binder on a polyurethane foam and then carrying an activated carbon. However, in order to put such a gas adsorption sheet to practical use as a filter, it is necessary to further laminate some sheet for preventing an activated carbon from falling off at least on the downstream side. Since the sheet for preventing an activated carbon from falling off is peeled off by a wind pressure during use even if the sheet is merely laminated without fixing, it is necessary to fix it by some method. One method includes a method using an adhesive. In this method, however, the same phenomenon as that described above occurs and the air permeation resistance becomes higher. A method using no binder includes an entangling method using a needle punch. However, since a fixing force of the activated carbon is small, the falling off degree of the activated carbon becomes larger to lower the deodorizing capability. Therefore, it was a problem on practical use.

Also, the specification of U.S. Pat. No. 5,605,746 discloses a fibrous structure comprising a non-woven fiber matrix formed from composite fibers of a heat adhesive fiber and the other fiber, and a granular activated carbon or the like entrapped in and fusion bonded to the matrix. In addition, the specification of U.S. Pat. No. 5,674,339 discloses a production method of such a fibrous structure. The production method comprises steps of dry forming an open fibrous web structure comprising the heat adhesive fiber and the other fiber, distributing and entrapping the granular activated carbon having a suitable size, weight, and the like in the web structure, and heating to fix the granular activated carbon or the like to the web structure by melt bonding.

However, in such a method for fixing the granular activated carbon by heat adhesive fiber, it is difficult to fix it with reliability so as not to fall off. Therefore strongly fixing of the granular activated carbon and adsorption or air-permeation property can not easily coexist as well as the above prior arts.

As explained above, a satisfactory gas adsorption sheet or air-purifying filter which firmly carries a granular activated carbon and is superior in adsorbability to a gas with bad odor and folding processability, and which causes small pressure loss and little clogging with dust, is not still obtained at present.

On the other hand, various filters obtained by integrally laminating a dust-removing filter and a deodorizing filter have been proposed to solve the problem about insufficient dust-removing performance.

For example, JP-A-4-74505 discloses a filter obtained by bonding a dust-removing filter using an electret non-woven fabric and a deodorizing filter formed by using a suspension of a granular activated carbon in a latex as an adhesive, and integrally forming the resultant into a shape of pleats. However, the electret non-woven fabric disclosed in this publication is a so-called span-bond type electret non-woven fabric. In the case of this non-woven fabric, the dust-removing function is insufficient. Since early clogging occurs to cause rapid increase of pressure loss, a life time of the filter is over before that of the deodorizing sheet is over. Therefore, it was not satisfactory in view of the filter function and economy.

JP-A-7-265640 discloses a filter wherein dust is three-dimensionally trapped by raising an electret fiber, thereby making it hard to cause clogging. The electret fiber disclosed in this publication is also a so-called span-bond type electret filter and, therefore, the charge rate was low and satisfactory dust-removing efficiency could not be obtained.

As described above, there is still to be obtained a filter having a combined function of dust-removing and deodorizing, which exerts a sufficient dust-removing effect and has a long filter life, at present.

Under these circumstances, the present invention has been accomplished. That is, an object of the present invention is to provide a gas adsorption sheet having good air permeability and excellent retention of an activated carbon, and an air-purifying filter whose dust-removing performance can be maintained for a long period to provide a method for producing the gas adsorption sheet.

To attain the above object, the present inventors have studied intensively about a structure for retaining the granular activated carbon by using a fiber and formation thereof. As a result, they have found that a gas adsorption sheet having good fixing strength of the granular activated carbon and good air permeability can be obtained by substantially fixing the granular activated carbon using a supporting fiber, not fixing the activated carbon using an adhesive.

The present inventors have also found that the above sheet can be preferably produced by mixing the granular activated carbon with the supporting fiber and subjecting the mixture to a wet paper method. In that case, they have found that it becomes possible to make the structure for retaining the granular activated carbon using the supporting fiber more strong and stable by adding a small amount of an adhesive fiber, in addition to the above granular activated carbon and supporting fiber.

The present invention provides a gas adsorption sheet characterized in that the deodorizing sheet and electret non-woven fabric are integrally laminated and, furthermore, the electret fiber is a film split type electret fiber. The present invention also provides an air-purifying filter characterized in that the above gas adsorption sheet is formed in a shape of pleats or wave.

The present inventors have further studied on the basis of the above knowledge, thus completing the present invention.

SUMMARY OF THE INVENTION

The above object can be attained by the present invention as described below.

The gas adsorption sheet of the present invention is a gas adsorption sheet having a granular activated carbon-containing sheet, said granular activated carbon-containing sheet comprising a granular activated carbon having an average particle diameter of 60 to 600 μm, a supporting fiber for fixing the granular activated carbon in contact with it, and an adhesive fiber which mainly contributes to shape retention. A gas adsorption sheet having good fixing strength of the granular activated carbon and good air permeability can be obtained by substantially fixing the granular activated carbon using a supporting fiber, not fixing the activated carbon using an adhesive. Thereby it becomes possible to minimize the amount of the adhesive component such as adhesive and to get the intrinsic deodorizing performance of the granular activated carbon to the utmost degree and, at the same time, it becomes possible to maintain the air permeation resistance of the whole sheet.

In the above sheet, the granular activated carbon-containing sheet preferably comprises a surface layer and a back layer formed on the back of the surface layer, the surface layer containing less granular activated carbon than the back layer. Such a surface layer makes it possible to fold in a state of being hardly contacted with the granular activated carbon. Also it becomes possible to surely prevent the granular activated carbon from flowing out by providing the surface layer on the downstream side on air permeation. From such a point of view, the sheet has a surface layer containing no granular activated carbon, more preferably.

It is preferred that the granular activated carbon-containing sheet is integrally formed by wet bonding using a water-swelling fiber as the adhesive fiber. In the case of such wet bonding, since the attaching force between the supporting fiber and granular activated carbon becomes larger on drying, the granular activated carbon is fixed in the sheet, integrally and firmly, it becomes very hard to arise falling off of the granular activated carbon upon folding.

With respect to the supporting fiber, an outer surface area is preferably not more than 1 m$^2$/g, a fiber length is from 3 to 20 mm and a density is from 0.8 to 1.7 g/cc. Thereby the air permeability, adsorption performance and paper-making property of the resulting gas adsorption sheet are improved.

The granular activated carbon-containing sheet preferably contains the granular activated carbon in an amount of 30 to 80% by weight based on the total weight. Thereby the adsorption performance and strength of the resulting gas adsorption sheet are improved.

The granular activated carbon-containing sheet is preferably provided with small pores capable of substantially permeating an air in a thickness direction. By forming these small pores, it is possible to further reduce pressure loss and to largely enhance the dust retention amount. Furthermore, it is possible to largely enhance the life of the gas adsorption sheet.

In that case, an average open area per one pore of the small pores is preferably from 0.5 to 3 mm$^2$. The number of the small pores is preferably from 1 to 20 per 1 cm$^2$ of the granular activated carbon-containing sheet. Furthermore, a porosity of the small pores is preferably from 3 to 10%.

In the present invention, it is preferred to further comprise an air-permeable sheet, in addition to the granular activated carbon-containing sheet described above. Because it is possible to further secure the prevention of the granular activated carbon from falling off upon folding or use as the filter. Considering a packing density in the sheet thickness direction, a coarse or dense state can be realized. Therefore, since dust can be retained comparative uniformly in the sheet thickness direction, when the dust is introduced from the upstream side, it becomes hard to increase pressure loss due to early clogging. Accordingly, it is preferred that the air-permeable sheet is laminated on the back layer of the granular activated carbon-containing sheet.

In that case, the air-permeable sheet preferably comprises a non-woven fabric made of a film split type electret fiber as a main component. Thereby it is possible to enhance the removing effect to sub-micron particles.

It is preferred that the air-permeable sheet is further provided with a cover sheet in the form of a non-woven fabric, woven fabric or net. Thereby handling properties as the filter, such as stabilization of the dust-removing efficiency, stabilization of dust retention amount, prevention of fuzz of film split type electret fiber, etc. can be further improved.

A packing density of the air-permeable sheet is preferably from 0.01 to 0.20 g/cc. Thereby the air permeability, dust retention amount, strength and handling properties are further improved.

On the other hand, the air-purifying filter of the present invention is an air-purifying filter obtained by forming a gas adsorption sheet into a shape of pleats or wave. This filter has good air permeability and excellent dust-removing performance and can maintain excellent dust-removing performance for a long period because the gas adsorption sheet of the present invention is used. Furthermore, an effective filtration area can be enhanced by forming into a shape of pleats or wave without falling off the granular activated carbon on processing as described above.

In that case, thickness of the filter formed is preferably from 10 to 400 mm and a distance between crests is preferably from 2 to 30 mm.

On the other hand, the production method of the present invention is a method for producing a gas adsorption sheet, which comprises a step of forming a granular activated carbon-containing sheet, said step comprising the steps of preparing an aqueous slurry containing a granular activated carbon having an average particle diameter of 60 to 600 μm, a supporting fiber and a water-swelling adhesive fiber, spreading the aqueous slurry in a sheet-like form, and mechanically dewatering and drying the aqueous slurry spread.

According to this production method, since an amount of the adhesive component required is very small, a granular activated carbon-containing sheet having low air permeation resistance can be formed and characteristics of the granular activated carbon can be utilized to the utmost degree. By utilizing a difference in sedimentation ratio of the solid content, it is also possible to form a surface layer containing less granular activated carbon than the back layer.

DETAILED DESCRIPTION OF THE PREFERRED EMBODIMENTS

First, the schematic configuration of the gas adsorption sheet of the present invention will be described with reference to the accompanying drawings.

Figure 1A:
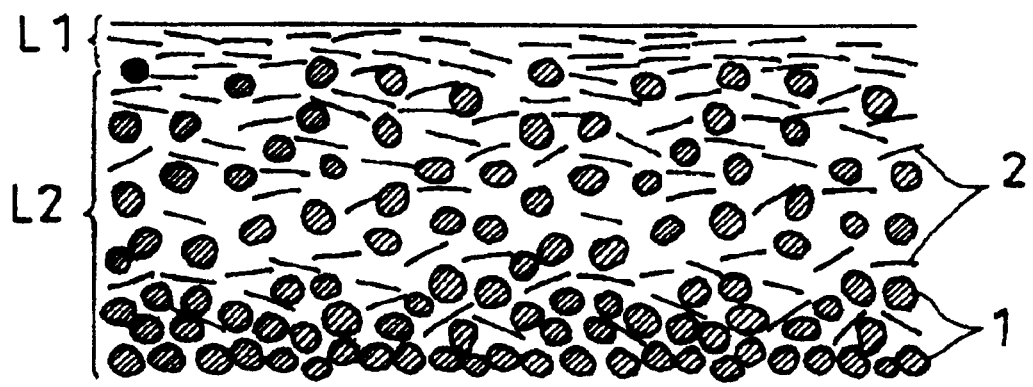
FIG. 1 is a schematic diagram showing a gas adsorption sheet of the present invention, in which (A) shows one formed only of a granular activated carbon-containing sheet and (B) shows one further comprising an air-permeable sheet and a cover sheet.

FIG. 1(A) shows a gas adsorption sheet formed only of a granular activated carbon-containing sheet according to the present invention. The granular activated carbon-containing sheet in the present invention comprises a granular activated carbon 1, a supporting fiber for fixing the granular activated carbon 1 in contact with it, and an adhesive fiber which mainly contributes to shape retention. In this drawing, the supporting fiber and adhesive fiber are shown as a mixed fiber component 2. In this embodiment, the lower the position in the drawing, the higher the content of the granular activated carbon. On the upper surface, a surface layer L1 containing less granular activated carbon 1 than a back layer L2, preferably no granular activated carbon, is formed. Such a configuration can be formed by utilizing a difference in sedimentation ratio of the solid content in the paper step for wet bonding. This drawing schematically shows a configuration of the gas adsorption of the present invention and the present invention is not limited to those with such a simple configuration.

Figure 1B:
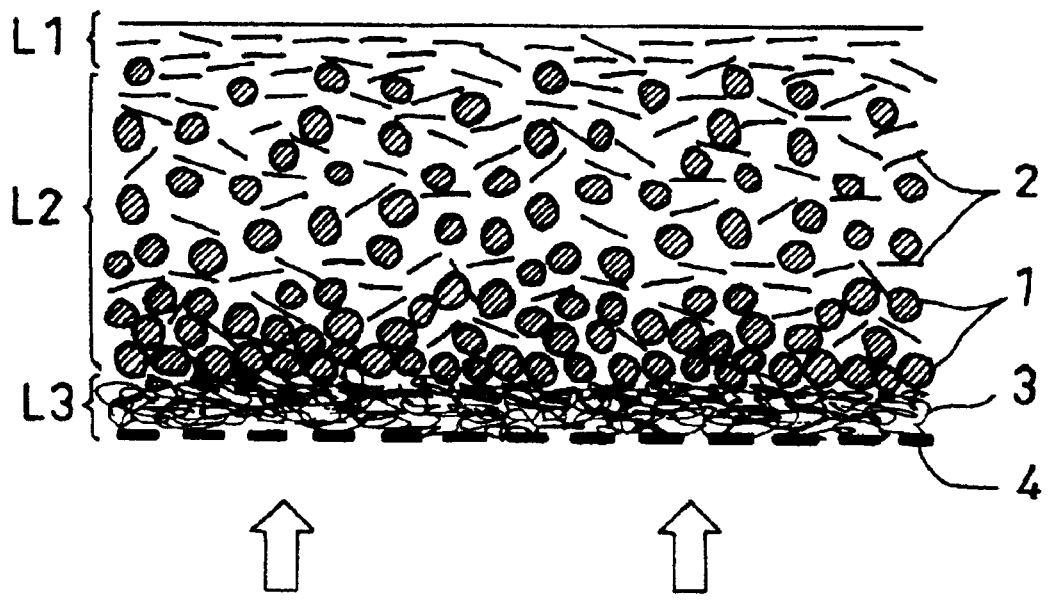

FIG. 1(B) shows a schematic diagram of the gas adsorption sheet further comprising an air-permeable sheet L3 and a cover sheet 4 according to the present invention. In this embodiment, the air-permeable sheet L3 and cover sheet 4 are laminated on the back layer L2 in order. As the particularly preferred air-permeable sheet L3, a non-woven fabric 3 made of a film split type electret fiber is used. The arrow in the drawing shows the direction of air flow in normal use.

The respective constituent materials will be described in detail below.

The average particle diameter of the granular activated carbon used in the gas adsorption sheet of the present invention is preferably from 60 to 600 $\mu$m, and more preferably from 100 to 500 $\mu$m, in terms of an average value in the case of using a JIS standard sieve (JIS Z8801) in view of the air permeability, falling off of the adsorbent, paper-making property or the like. When the average particle diameter is smaller than 60 $\mu$m, pressure loss becomes too large to obtain a desired high adsorption capacity. At the same time, the sheet packing density is liable to become higher and can cause an early increase in pressure loss upon dust removing. When the average particle diameter exceeds 600 $\mu$m, falling off is liable to occur and the initial adsorption performance in one pass becomes very low and, furthermore, the processability upon folding and forming into a wave shape is lowered in the case of an air-purifying filter having a shape of pleats or honeycomb.

The above granular activated carbon can be obtained by appropriately adjusting a particle size using a normal classifying apparatus.

The granular activated carbon used in the gas adsorption sheet of the present invention is not specifically limited. For example, those derived form coconut shell, wood, charcoal and pitch are preferably used. The above granular activated carbon is preferably used in the form of ground carbon, granulated carbon or beads carbon.

A toluene adsorption amount measured in accordance with JIS K1474 of the granular activated carbon used in the gas adsorption sheet of the present invention is preferably not less than 20% by weight. This is because high adsorption performance is required to a non-polar gaseous or liquid substance such as gas with bad odor.

The granular activated carbon used in the gas adsorption sheet of the present invention may be subjected to a chemical treatment for the purpose of improving the adsorption performance of a polar substance. The chemical used in a gas chemical treatment includes, for example, amine chemical (e.g. ethanolamine, polyethyleneimine, aniline, p-anisidine, sulfanilic acid, etc.), sodium hydroxide, potassium hydroxide, guanidine carbonate, guanidine phosphate, aminoguanidine sulfate, 5,5-dimethylhidantoin, benzoguanamine, 2,2-iminodiethanol, 2,2,2-nitrotriethanol, ethanolamine hydrochloride, 2-aminoethanol, 2,2-iminodiethanol hydrochloride, p-aminobenzoic acid, sodium sulfanilate, L-arginin, methylamine hydrochloride, semicarbazide hydrochloride, hydrazine, hydroquinone, hydroxylamine sulfate, permanganate, potassium carbonate, and potassium hydrogencarbonate are preferably used to an acidic polar substance such as aldehyde gas, nitrogen compound (e.g. $No_x$, etc.), sulfur compound (e.g. $SO_x$, etc.) and acetic acid. For example, phosphoric acid, citric acid, malic acid and ascorbic acid are preferably used to a basic polar substance such as ammonia, methylamine, trimethylamine and pyridine. The chemical treatment is conducted, for example, by retaining a chemical with the granular activated carbon or adding it to be adhered to the carbon. In addition to a method of directly treating the activated carbon with the chemical, a method of coating the surface of the sheet including them or a method of impregnating the whole sheet can also be used.

The granular activated carbon-containing sheet contained in the gas adsorption sheet of the present invention preferably contains the granular activated carbon in an amount of 30 to 80% by weight. When the amount is smaller than 30% by weight, good adsorption performance can not be obtained. On the other hand, when it exceeds 80% by weight, the strength of the gas adsorption sheet tends to be lowered.

The granular activated carbon-containing sheet contained in the gas adsorption sheet of the present invention preferably contains the supporting fiber in an amount of 5 to 50% by weight. When the amount is smaller than 5% by weight, the paper-making property becomes inferior. On the other hand, when it exceeds 50% by weight, the adsorption effect tends to become inferior.

The outer surface area of the supporting fiber used in the gas adsorption sheet of the present invention is preferably not more than 1 $m^2/g$. When the outer surface area exceeds 1 $m^2/g$, the air permeability and paper-making property tend to be lowered.

As the above supporting fiber, both of a fibrillated fiber and non-fibrillated fiber can be used.

The fiber length of the supporting fiber used in the gas adsorption sheet of the present invention is preferably from 3 to 20 mm. When the fiber length is smaller than 3 mm, the air permeability is deteriorated. On the other hand, when it exceeds 20 mm, the paper-making property and formation of the sheet tend to be deteriorated and the dispersion of the air-permeation resistance and the adsorption performance tend to become larger.

The density of the supporting fiber used in the gas adsorption sheet of the present invention is preferably from 0.8 to 1.7 g/cc. When the density is smaller than 0.8 g/cc, a paper-making slurry is formed in the state of separating the supporting fiber and granular activated carbon and, therefore, a dense layer of the supporting fiber is formed, thereby to increase pressure loss. Also the fixing of the granular activated carbon by the supporting fiber becomes insufficient, resulting in increased falling off of the granular activated carbon. On the other hand, when the density exceeds 1.7 g/cc, since a difference in density between the supporting fiber and granular activated carbon (density: about 1.8) is small, a surface layer is not formed and the expected object is hardly attained.

As the above supporting fiber, a hydrophilic one is preferred. This is because the activated carbon-containing sheet is formed more firmly.

The material of the supporting fiber used in the gas adsorption sheet of the present invention is not specifically limited. For example, there can be used synthetic fibers made of polyester, polyacrylonitrile, polyamide, polyolefin, etc. and fibers made of linter, cotton, hemp, wood pulp, rayon, glass, etc. Preferred are fibers made of wood pulp, rayon, polyester, polyolefin, polyamide, etc.

The cross section of the fiber may have a concentric circular or irregular shape. A crimped fiber can also be used.

The adhesive fiber used in the gas adsorption sheet of the present invention may be any one which serves as an adhesive component (binder) on mixing, such as water-swelling fiber, heat adhesive fiber or the like. For example, there can be preferably used polyvinyl alcohol fiber, polyethylene fiber, polypropylene-polyethylene fiber, polyester complex fiber, polyamide complex fiber or the like.

Such a fiber may also be a fiber having a sheath core or side-by-side structure, or a crimped fiber.

The density of the adhesive fiber used in the gas adsorption sheet of the present invention is preferably from 0.8 to 1.7 g/cc. Thereby the adhesive fiber is present close to the supporting fiber after forming a paper-making slurry, and the shape retention of the surface layer and back layer of the granular activated carbon-containing sheet are improved.

The fiber length of the adhesive fiber used in the gas adsorption sheet of the present invention is preferably from 1 to 20 mm. When the fiber length is smaller than 1 mm, the air permeability is deteriorated. On the other hand, when it exceeds 20 mm, the paper-making property and formation of the sheet are deteriorated and the dispersion of the air permeation resistance and adsorption performance is increased.

The mixing ratio of the adhesive fiber used in the gas adsorption sheet of the present invention is preferably from 1 to 30% by weight, and more preferably from 5 to 20% by weight. When the mixing ratio is smaller than 1% by weight, it is impossible to exert a function as the adhesive component. On the other hand, when it exceeds 30% by weight, the adsorption property is relatively lowered and pressure loss is increased.

The gas adsorption sheet of the present invention may also be formed by containing components having an accompanying function, such as antimicrobial agents, antifungal agents, antiviral agents, flame retardants, etc. These components may be incorporated into the fibers, or incorporated by coating or carrying according to post-processing. For example, by containing the flame retardant, it is possible to produce a gas adsorption sheet corresponding to the standard of flame retardancy defined in FMVSS. 302 and UL Flame Retardant standard.

In the above cases, an attention must be paid so as not to damage the intrinsic adsorbing function of the granular activated carbon.

It is also possible to enhance the deodorizing function by using a fiber having an adsorption performance, for example, using an ion exchange fiber.

The thickness of the gas adsorption sheet of the present invention is preferably from 0.3 to 2.5 mm. Thereby the air permeability and processability are improved.

The weight per a square meter of the gas adsorption sheet of the present invention is preferably not less than 50 g/m$^2$. When the weight is not less than 200 g/m$^2$, it is possible to further enhance the adsorbability and removing effect becomes sensible.

The packing density of the gas adsorption sheet of the present invention is preferably from 0.15 to 0.3 g/cc, and more preferably from 0.17 to 0.25 g/cc. When the packing density is smaller than 0.15 g/cc, the dust removing efficiency is lowered. On the other hand, when it exceeds 0.3 g/cc, early increase in pressure loss is caused by clogging, which is not preferred as the filter. To adjust to such a sheet density, a proper amount of a fiber having a fiber diameter of not less than 15 $\mu$m is preferably mixed in the supporting fiber because it becomes easy to form a space between the fiber and activated carbon.

Figure 2:
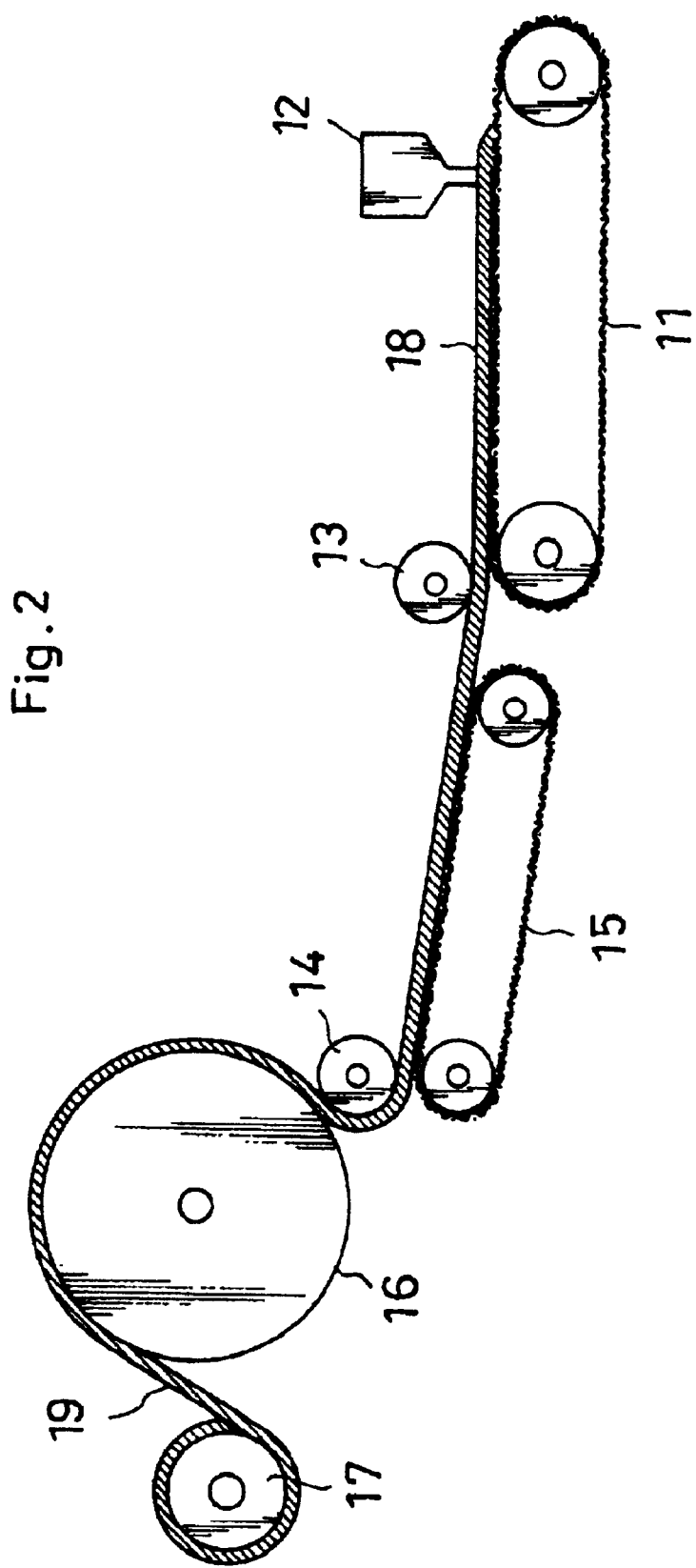
FIG. 2 is a schematic explanation diagram showing a configuration example of an apparatus used when the gas adsorption sheet of the present invention by a wire paper method.

The granular active carbon-containing sheet included in the gas adsorption sheet of the present invention can be produced by various methods, but the production method of the present invention can be applied as a particularly preferred one. The production method of the present invention is a method for producing a gas adsorption, which comprises a step of forming a granular activated carbon-containing sheet, said step comprising the steps of preparing an aqueous slurry containing a granular activated carbon having an average particle diameter of 60 to 600 $\mu$m, a supporting fiber and a water-swelling adhesive fiber, spreading the aqueous slurry in a sheet-like form, and mechanically dewatering and drying the aqueous slurry spread. Preferred embodiment will be described with reference to FIG. 2.

The above aqueous slurry is usually prepared by using water or an aqueous solution as a dispersion medium according to a conventional method, and is supplied from the bottom portion of a container 12. The supplied aqueous slurry is spread in a sheet-like form on the upper surface of a net-like endless belt 11 and then mechanical dewatering is slowly conducted with conveying to form a wet web 18. In the case of the mechanical dewatering, there can be used a wire paper method, a short wire paper method and a cylinder paper method. Furthermore, a method of slightly squeezing by using press rollers 13,14 and suction dewatering can also be used.

The dewatered web is conveyed to a rotary drying drum 16 by an endless belt for conveying sheet 15 and then contact-dried on the rotary drying drum 16 to form a gas adsorption sheet 19. The gas adsorption sheet of the present invention can be produced as a continuum by conducting a series of the above steps with winding this gas adsorption sheet 19 around a roll 17. In that method, yield can also be improved by adding a proper amount of a polymeric or inorganic dispersing or flocculating agent in the slurry.

On the other hand, the gas adsorption sheet of the present invention can also be produced by pouring the above slurry into a metal mold or resin mold with pores, followed by suction and further drying. It is also possible to produce the gas adsorption sheet by using a method of previously making a non-woven web containing a supporting fiber and an adhesive fiber, dispersing an activated carbon therein and blowing a hot air. It is more preferred to produce it through the above step of dispersing in water considering uniform dispersion of the activated carbon, etc.

Regarding the gas adsorption sheet of the present invention, the above mentioned characteristics can be further improved by forming small pores substantially permeating an air in the thickness direction of the gas adsorption sheet.

These small pores may penetrate the gas adsorption sheet or not, and may be pores which are formed in the thickness direction of the gas adsorption sheet and are capable of substantially air permeable.

The average open area per one pore of the small pores formed in the gas adsorption sheet of the present invention is preferably from 0.5 to 3 mm$^2$, and more preferably from 1 to 2 mm$^2$ When the average open area is smaller than 0.5 mm$^2$, the effect of reducing the air permeation resistance and reducing clogging by the dust is small. On the other hand, when the average open area exceeds 3 mm$^2$, fixing of the granular activated carbon becomes insufficient and there is a fear of falling off the granular activated carbon.

For samples having a size of 1 cm×1 cm obtained by cutting from arbitrary three points of the gas adsorption sheet, the average open area per one pore is determined by using a microscope with an area measuring function, e.g. high-accuracy digital microscope VH-6330 manufactured by KEYENCE CORPORATION.

The porosity of the small pores formed in the gas adsorption sheet of the present invention is preferably from 3 to 10%, and more preferably from 5 to 8%. When the porosity is smaller than 3%, the effect of reducing the air permeation resistance and reducing clogging by the dust is small. On the other hand, when the porosity exceeds 10%, fixing of the granular activated carbon becomes insufficient and there is a fear of falling off the granular activated carbon.

For samples having a size of 1 cm×1 cm obtained by cutting from arbitrary three points of the gas adsorption sheet, the porosity is determined by measuring the sum of the open area and calculating from the following equation.

$$\text{Porosity } (\%) = [\text{sum of open area}]/[\text{sample area}] \times 100$$

Considering the open area and porosity as described above, the number of the fine pores formed in the gas adsorption sheet is preferably from 1 to 20, and more preferably from 5 to 15, per 1 cm$^2$ of the granular activated carbon-containing sheet.

The method of opening the small pores formed in the gas adsorption sheet of the present invention is not specifically limited, and a needle punch method, an air punch method and a water punch method are preferably used alone or in combination thereof. The shape of the open portion is not specifically limited, but is preferably a cylindrical or conical.

The gas adsorption sheet of the present invention causes less falling off of the activated carbon and has low air permeation resistance, high deodorizing performance and high dust-removing performance. But it is preferred to laminate the air-permeable sheet on the back layer of the granular activated carbon-containing sheet described above due to the reason described above.

The kind of the air-permeable sheet used in the gas adsorption sheet of the present invention is not specifically limited. For example, a non-woven fabric, a woven fabric or a nit may be preferably used.

The material of the air-permeable sheet used in the gas adsorption sheet of the present invention is not specifically limited. For example, wood pulp, rayon, acetate, polyester, polyacrylonitrile, polyamide, polypropylene, polyethylene and polychlal can be used alone or in combination thereof.

As an air-permeable sheet used in the gas adsorption sheet of the present invention, a permanently charged electret sheet is particularly laminated, so that the effect of removing sub-micron particles including cigarette smoke particles, carbon particles, sea salt particles, etc. can be enhanced. As the method of obtaining such an electret sheet, there can be used a known method such as method of forming a fiber made of a raw material capable of converting into an electret into a non-woven fabric and subjecting the non-woven fabric to a corona charge treatment and a film split method of splitting an electret film into fibers and forming them into a non-woven fabric. It is particularly preferred to use the film split method which can enhance charging efficiency and can form a sheet in a bulky state with lowered pressure loss.

The raw material of the film split type electret fiber used in the present invention is not specifically limited. For example, there can be preferably used polyolefin polymer such as polypropylene, polyethylene, syndiotactic polystyrene, etc.; a-polyolefin polymer such as poly-4-methyl-1-pentene, etc.; fluoropolymer such as teflon, etc.; and polycarbonate, polyester, etc.

The method of producing the film split type elecret fiber used in the present invention is not specifically limited. For example, the film split type elecret fiber is produced by melt-extruding the above resin to make a cast film, stretching this film in a stretching ratio of 5–10 in a longitudinal or transverse direction to form a stretched film, charging the stretched film to make an electret film, and splitting the electret film using a fiber splitting cutter.

In the case of charging the stretched film, charging methods such as corona charging, field discharging, electron beam radiation, friction charging and the like can be used alone or in combination. As the method of splitting the electret film, a method using a needle cutter, a screw cutter, a blade cutter, etc. can be used.

The average split width of the film split type electret fiber used in the present invention is preferably from 10 to 500 μm, more preferably from 20 to 300 μm, and most preferably from 40 to 200 μm.

The thickness of the electret film of the film split type electret fiber used in the present invention is preferably from 3 to 30 μm.

The surface charge density of the film split type electret fiber used in the present invention preferably has a maximum surface charge density represented by the Roos's formula, but is not specifically limited.

The packing density determined by the following equation of the film split type electret fiber in the air-permeable sheet used in the present invention is preferably from 0.01 to 0.20 cc/cc. When the packing density exceeds 0.20 cc/cc, the density becomes higher because of the pressure in the step of integrating with the deodorizing sheet and the air permeating resistance becomes higher. On the other hand, when the packing density is smaller than 0.01 cc/cc, it becomes difficult to maintain the stable density and to handle in view of the strength.

The above packing density refers to a packing density of the film split type electret fiber in the air-permeable sheet and is calculated by the following formula.

$$\text{Packing density } (cc/cc) = (W \times 10^{-4})/(T \times \rho)$$

where W: weight of fiber layer (g/m$^2$)

T: thickness of fiber layer (cm)

ρ: density of fiber (g/cc)

The weight of the film split type electret fiber in the air-permeable sheet used in the present invention is preferably from 5 to 250 g m$^2$. When the weight is smaller than g/m$^2$, the removing efficiency of dust is low. On the other hand, when it exceeds 250 g/m$^2$, clogging is liable to occur.

In the film split type electret fiber used in the present invention, additives can be used to improve the charging property. These additive used herein are not specifically limited. For example, there can be used resin modifiers such as sodium bis(4-t-butylphenyl)phosphate, sodium 2,2'-ethylidenebis(4,6-di-t-butylphenyl)phosphate, etc.; antioxidants such as tris(3,5-di-t-butyl-4-hydroxybenzyl)

isocyanurate, 1,1,3-tris(2-methyl-4-hydroxy-5-t-butylphenyl)butane, 1,1-bis(2'-methyl-4-hydroxy-5'-t-butylphenyl)butane, 2,2-thio-diethylenebis[3-(3,5-di-t-butyl-4-hydroxyphenyl)propionate], 3,9-bis[2-{3-t-butyl-4-hydroxy-5-methylphenyl}propionyloxy}-1,1-dimethylethyl]2,8,10-tetraoxaspiro[5,5]undecane, bis(2,4-di-t-butylphenyl)pentaerythritol diphosphate, bis(2,6-di-butyl-4-methylphenyl) pentaerythritol diphosphate, ethylidenebis(4,6-di-t-butylphenyl)octylphosphite, etc.; heavy metal deactivators such as 3-(N-salicyloyl)amino-1, 2,4-triazole, disalicyloylhydrazide decanedicarboxylate, etc.; photostabilizers such as 2-(2'-hydroxy-5'-methylphenyl)benzotriazole, 2-(2'-hydroxy-3'-t-butyl-5'-methylphenyl)-5-chlorobenzotriazole, 2,2'-methylenebis[4-(1,1,3,3-tetramethylbutyl)-6-(2N-benzotriazol-2-yl)phenol], bis(5-benzoyl-4-hydroxy-4-piperidyl)-1,2,3,4-butane tetracarboxylate, 1,2,2,6,6-pentamethyl-4-piperidyl/β,β,β', β'-tetramethyl-3,9-[2,4,8,10-tetraoxaspiro(5,5)undecane] diethyl (mixed)-1,2,3,4-butane tetracarboxylate, etc.; and aliphatic acid metal salts such as magnesium stearate, aluminum stearate, aluminum laurate, etc.

The amount of these additives varies depending on the kind of the additives, but is effectively within a range from 0.05 to 5% by weight based on the weight of the film split type electret fiber.

The air-permeable sheet used in the present invention is preferably provided with a cover sheet as described above. As the form of the cover sheet, for example, anon-woven fabric, a woven fabric and a net-like substrate are preferably used.

As the method of providing the cover sheet, the cover sheet and non-woven fabric containing the above film split type electret fiber as a main component may be laminated integrally by mechanically entangling method such as a needle punch method or an air punch method.

The raw material of the above cover sheet is not specifically limited and includes, for example, polyamide, polypropylene, rayon, polyester, polytetrafluoroethylene, polyvinyl alcohol, polyacrylonitrile, polychlal, polyethylene or the like.

The weight of the cover sheet is small as possible to attain low pressure loss and high dust removing percentage, and is preferably from 5 to 100 g/m².

The cover sheet is preferably melt-bonded between adjacent fibers by mixing a heat adhesive fiber in the cover sheet because fuzz is further inhibited.

In that case, heat adhesive fibers having various cross-sectional shapes such as circular cross-section, rectangular cross-section, etc. can be used. The heat adhesive fiber may be a resin of a single component or may be composed of a plurality of components. The heat adhesive fiber composed of plural components may also be a fiber having a side-by-side or sheath core structure. For example, in the case of the fiber having a sheath core structure, a resin wherein a melting point of the sheath portion is lower than that of the core portion is used. Such a combination includes, for example, combination of a sheath made of polyethylene or an ethylene-vinyl acetate copolymer and a core made of polypropylene, and combination of a sheath made of a copolymerized polyester having low melting point and a core made of polyethylene terephthalate. In such way, when resins having different melting temperatures are used in combination to form one fiber having a low melting temperature on the surface of the other fiber, the shape of the inner fiber can be maintained by only melting the surface portion at a predetermined temperature. As a matter of course, a plurality of these fiber layers may also be laminated each other.

The non-woven fabric comprising the film split type electret fiber as a main component used in the present invention may be mixed with an antimicrobial fiber, a deodorizing fiber, an aromatic fiber, a flame-retardant fiber, or an electret fiber or non-woven fabric made by a spun bond or melt blown as far as the function of the fiber layer is not lost.

The packing density of the air-permeable sheet used in the present invention is preferably from 0.01 to 0.20 g/cc, and more preferably from 0.02 to 0.15 g/cc. When the packing density exceeds 0.20 g/cc, pressure loss becomes higher and the dust retention amount is lowered. On the other hand, when it is smaller than 0.01 g/cc, the strength is lowered and the handling property is deteriorated.

The packing density of the air-permeable sheet refers to a packing density of all elements including the film split type electret fiber, cover sheet and other additives, which constitute the air-permeable sheet, and is calculated by the following formula.

Packing density $(g/cc)$=[weight of air-permeable sheet $(g/cm^2)$]/ [thickness of air-permeable sheet $(cm)$]

In the above formula, the thickness of the air-permeable sheet is determined as a difference between the thickness of the whole gas adsorption sheet and the thickness of a deodorizing sheet when a pressure of 180 gf/cm² is applied to the gas adsorption sheet.

In the gas adsorption sheet of the present invention, the method of laminating the granular activated carbon-containing sheet and air-permeable sheet is not specifically limited and, for example, these sheets may also be merely laminated each other without fixing. Additional examples thereof include coating of a small amount of an adhesive, or bonding method utilizing heat-bonding properties, for example, method of spraying an adhesive fiber to an adherend, method of bonding by inserting an adhesive sheet into both sheets, method of bonding by melting using ultrasonic, method, etc. or method using no binder, for example, needle punch method, air punch method, water entangling method, etc. Anyway, since it is provided on the upstream side, the air-permeable sheet is not simply peeled off by a wind pressure and strong adhesion is not required.

The air-purifying filter of the present invention is preferably obtained by forming the gas adsorption sheet explained above into a shape of pleats or wave.

The thickness of the formed air-purifying filter is preferably from 10 to 400 mm. In the case of an application for car installation (e.g. installation of car air-conditioner, etc.) and domestic air-purifying apparatus, the thickness is preferably from about 10 to 60 mm in view of a normal interior space. In the case of a large-size filter unit installed exclusively in a building air-conditioning application, the thickness is preferably from about 40 to 400 mm in view of an installing space.

The distance between crests of the pleats of the air-purifying filter according to the present invention is preferably from 2 to 30 mm. When the distance is less than 2 mm, the distance between the pleats is too small and the dead space is large and, therefore, it becomes impossible to effectively use the sheet. On the other hand, when the distance is more than 30 mm, the sheet spreading area is reduced and, therefore, it becomes impossible to obtain a removing effect according to the thickness of the filter.

In the air-purifying filter of the present invention, which is integrated with an air-permeable sheet, it is preferred to provide a surface layer of the granular activated carbon-containing sheet on the downstream side from the back layer. Thereby it becomes hard to peel off the integrated air-permeable sheet.

EXAMPLE

The following working examples further illustrate the present invention in detail but are not to be construed to limit the scope thereof. Any workshop modification in accordance with the purport described above or below is included in the technical scope of the present invention.

The numerical values in the Examples are values measured by the following procedure.

(1) Dust (JIS type 15) Retention Amount

The following mixed powders were supplied under the conditions of a linear speed of 30 cm/second and a supplying concentration of 0.5 g/m$^3$ and the time at which the pressure loss increased by 150 Pa from the initial pressure loss is judged that the life was over. At the time, the amount of dust accumulated in the filter material was weighed by using a balance. This value shows substitutable characteristics of the clogging degree by dust.

| Composition of mixed powder | |
|---|---|
| Dust (JIS type 8) (average particle diameter: about 8 μm, Kanto-loam) | 72% by weight |
| Carbon black (average particle diameter: about 0.1 μm) | 23% by weight |
| Cotton linter (average size: about 1.5 μm) | 5% by weight |

(2) Air Permeation Resistance

Pressure loss was measured on air permeation under the conditions of a linear speed of 30 cm/second.

(3) Particles Removing Efficiency

Using NaCl particles (0.3 μm), each particle concentration of the filter at the upstream/downstream sides was measured at a linear speed of 30 cm/second by a particle counter (KC-01C, manufactured by Rion Co.). Then, the particles removing efficiency was represented by percentage of a value obtained by dividing a value, which is obtained by subtracting the particles concentration at the downstream side from that at the upstream side, by the particles concentration at the upstream side.

(4) Sheet Packing Density

Sheet packing density (g/cc)=[weight of sheet]/[thickness of sheet]

[The thickness of the sheet is a value under a pressure of 180 gf/cm$^2$]

(5) Peelability of a Reinforcing Sheet

Peelability of a reinforcing sheet from the body sheet under the conditions of a linear speed of 30 cm/second was also compared.

Example 1

70 Parts by weight of a granular activated carbon having an average particle diameter of 310 μm and toluene adsorbability measured by JIS K 1474 method of 470 mg/g, 18 parts by weight of a rayon fiber having 8 denier and a fiber length of 8 mm, and 12 parts by weight of polyvinyl alcohol having 1 denier and a fiber length of 3 mm as a hot water soluble fiber were dispersed in water by using a pulper to prepare a slurry for wet paper-making. Using an apparatus shown as in FIG. 2, a wet web was made by a wire paper method, slightly squeezed by a press roller and then dried by a rotary drying drum at 140 C to obtain a low-packing density gas adsorption sheet having a weight of 300 g/m$^2$ and a sheet packing density of 0.21 g/cc. In this sheet, a difference in sedimentation rate occurred on a paper-making screen due to a difference in density between the granular activated carbon and rayon (density: about 1.5) or polyvinylalcohol (density: about 1.3). As a result, an activated carbon-containing layer (back layer) and a surface layer consisting of a supporting layer and an adhesive fiber could be formed.

The back layer of this sheet was provided at the upstream side and pressure loss was measured. As a result, it was very small such as 30 Pa and the toluene adsorption amount was 33% based on the weight of the sheet and, therefore, the resulting sheet has very high adsorbability. The sheet was superior in handling properties because the granular activated carbon was not fallen off during use as a filter. Deserving special mention, an increase in pressure loss is very slow on dust loading (JIS type 15) until the pressure reaches a final pressure and clogging hardly occurs. Finally, dust could be retained in an amount of 40 g/m$^2$. It is a sheet which is not only superior in a deodorizing function, but also superior in a dust-removing function. This sheet was formed into a shape of pleats having a filter thickness of 40 mm and a distance between crests of 7 mm to obtain a filter unit by using a reciprocal folding machine. As a result, cracks did not occur at the folded portion of pleats. It has also been found that this filter is rigid and pleats are not broken even if a wind is blown from the folded side at a speed of 4 m/second. That is, this filter is superior in processability and handling properties.

Example 2

70 Parts by weight of a granular activated carbon having an average particle diameter of 310 μm and toluene adsorbability measured by JIS K 1474 method of 470 mg/g, 10 parts by weight of a rayon fiber having 8 denier and a fiber length of 8 mm, 12 parts by weight of fibrous polyvinyl alcohol having 1 denier and a fiber length of 3 mm, and 8 parts by weight of a polyester complex fiber having 2 denier and a fiber length of 5 mm, and having a sheath core structure, of which a sheath portion has a melting of 110° C., were dispersed in water by using a pulper to prepare a slurry for wet paper-making. A wet web was made by a wire paper method, slightly squeezed by a press roller and then dried by a rotary drying drum at 140° C. to obtain a low-packing density gas adsorption sheet having a weight of 400 g/m$^2$ and a sheet packing density of 0.18 g/cc. In this sheet, due to a difference in sedimentation rate, an activated carbon-containing layer (back layer) and a surface layer consisting of a supporting layer and an adhesive fiber could be formed similar to Example 1.

The back layer of this sheet was provided at the upstream side and pressure loss was measured. As a result, it was very small such as 32 Pa and the toluene adsorption amount was 33% based on the weight of the sheet and, therefore, the resulting sheet has very high adsorbability. The sheet was superior in handling properties because the granular activated carbon was not fallen off during use as a filter. Deserving special mention, an increase in pressure loss is very slow on dust loading (JIS type 15) until the pressure reaches a final pressure and clogging hardly occurs. Finally, dust could be retained in an amount of 38 g/m$^2$. It is a sheet which is not only superior in a deodorizing function, but also superior in a dust-removing function. To confirm the actual effect of this gas adsorption sheet, the sheet was formed into a shape of pleats having a filter planar size of 200 mm×180 mm, a filter thickness of 40 mm and a distance between crests of 7 mm, which was further provided with a flame member for fixing end surfaces to make a unit. The unit was installed in a car air-conditioner and operated at a steady state (AUTO, wind speed of about 1 m/second) while being maintained at a mode of open-air introduction. As a result, an air-conditioning capacity did not change in comparison with the case where no filter is installed. However, when traveling with keeping a distance of 10 m behind from a diesel off-gas motorcar, all passengers (four panelists) did not feel an unpleasant odor peculiar to a diesel off-gas.

Example 3

In the same manner as in Example 2, except that a granular activated carbon having an average particle size of 130 μm was used but the supporting fiber and adhesive fiber were respectively used in the same proportion, a deodorizing sheet having a weight of 170 g/m² was made. The back layer of this sheet was provided at the upstream side and pressure loss was measured. As a result, it was very small such as 28 Pa and the toluene adsorption amount was 33% based on the weight of the sheet and, therefore, the resulting sheet has very high adsorbability. The sheet was superior in handling properties because the granular activated carbon was not fallen off during use as a filter. Deserving special mention, an increase in pressure loss is very slow on dust loading (JIS type 15) until the pressure reaches a final pressure and clogging hardly occurs. Finally, dust could be retained in an amount of 41 g/m². It is a sheet which is not only superior in a deodorizing function, but also superior in a dust-removing function.

Comparative Example 1

A dispersion of butadiene-acrylonitrile (10%) in water was sprayed to a low-pressure loss non-woven fabric made of polypropylene having an air permeation resistance of 5 Pa and a weight of 20 g/m² and, after simple drying, 210 g of the same activated carbon as that of Example 1 was supported with the non-woven fabric. The air permeation resistance of this sheet was very high such as 60 Pa. On dust (JIS type 15) loading, an increase in pressure loss occurred early and, finally, dust could be retained only in an amount of 10 g/m².

Comparative Example 2

A net (pressure loss: 2 Pa) made of a polypropylene having a weight of 50 g/m² and a sieve opening of 4×4 mm was impregnated with an acrylonitrile-butadiene latex-based emulsion as a binder, squeezed slightly between rubber rollers, supported with the same activated carbon as that in Example 1 and further squeezed between the rubber rollers. Then, excess activated carbon was blown off by an air blow. The air permeation resistance of this sheet was low such as 30 Pa, but a large amount of the activated carbon was fallen off and the sheet could not be used as a practical filter as it is. To prevent the activated carbon from falling off, the non-woven fabric made of polypropylene having a weight of 20 g/m² used in Comparative Example 1 was integrated at the downstream side by a needle punch method. However, there was a problem that a large amount of the activated carbon was fallen off and the non-woven fabric was peeled off during the use. Therefore, the filter was not suited for practical use.

The above results are shown in Table 1.

TABLE 1

| | Material | | Characteristics | | | | |
|---|---|---|---|---|---|---|---|
| | Average particle diameter of activated carbon (μm) | Fiber component | Amount of activated carbon in sheet (g/m²) | Pressure loss (Pa) | (JIS type 15) retention amount (g/m²) | Falling off of activated carbon | Peeling of reinfocing sheet |
| Example 1 | 310 | Rayon 8d × 8<br>Polyvinyl alcohol 1d × 3 | 210 | 30 | 40 | Good | None |
| Example 2 | 310 | Rayon 8d × 8<br>Polyvinyl alcohol 1d × 3<br>Polyester complex fiber 2d × 5 | 280 | 32 | 38 | Good | None |
| Example 3 | 130 | | 120 | 28 | 41 | Good | None |
| Comparative Example 1 | 310 | Polypropylene non-woven fabric | 210 | 60 | 10 | Good | None |
| Comparative Example 2 | 310 | Polypropylene net | 210 | 30 | 30 | Poor | Observed |

(Preparation Example of Air-Permeable Sheet for Dust-Removing)

Air-Permeable Sheet A

An electret split fiber layer (weight: 30 g/m²) composed only of an electret film split fiber made of polypropylene (containing 0.3% of aluminum laurate) having a thickness of 8.5 μm and an average split width of 65 μm was made. Although pressure loss of this fiber layer is very low such as 7 Pa, the particles removing efficiency was very large such as 40%.

Air-Permeable Sheet B

An electret split fiber layer (weight: 30 g/m²) made of a polypropylene (containing 0.3% of aluminum laurate) electret film split fiber having a thickness of 8.5 μm and an average split width of 65 μm and a heat adhesive fiber (4 denier, weight: 10 g/m²) wherein sheath portion is made of a copolymerized polyester and a core portion is made of polyethylene terephthalate were laminated each other. The laminated was subjected to a needle punch processing at a punch density of 50 punch/inch² and then heat-treated in a hot-air oven at 120° C. for 30 seconds to make a film split type electret fiber layer A. Although pressure loss of this fiber layer is very low such as 8 Pa, the particles removing efficiency was very large such as 40%.

Air-Permeable Sheet C

An electret split fiber layer (weight: 30 g/m²) made of a polypropylene (containing 0.3% of aluminum laurate) electret film split fiber having a thickness of 8.5 μm and an average split width of 65 μm and a non-woven polypropylene fabric (4 denier, weight: 15 g/m²) made by dry method were subjected to a needle punch processing to make a film split type electret fiber layer B. Although pressure loss of this fiber layer is very low such as 8 Pa, the particles removing efficiency was very large such as 41%.

Example 4

In the same manner as in Example 2, a deodorizing sheet having a weight of 350 g/m² was made and an adhesive (fiber diameter: 50 μm) having a probe tack of 950 g/5 mmφ at 25° C. defined in ASTM D2979 was sprayed in an amount of 4 g/m², to the back layer of the sheet. After laminating with the air-permeable sheet A, the laminate was slightly interposed between press rollers and then integrally bonded at normal temperature to make an integrated dust-removing deodorizing sheet. Some fuzz occurred at the air-permeable sheet side of this sheet, but it was not unsuitable for practical use.

Example 5

An adhesive (fiber diameter: 50 μm) having a probe tack of 950 g/5 mmφ at 25° C. defined in ASTM D2979 was sprayed in an amount of 4 g/m² to the back layer of the deodorizing sheet (weight: 170 g/m²) obtained in Example 3. After laminating with the air-permeable sheet B, the laminate was slightly interposed between press rollers and then integrally bonded at normal temperature to make an integrated dust-removing deodorizing sheet. This sheet was superior in handling properties because fuzz is not observed on both surfaces of this sheet.

Although pressure loss of this fiber layer is low such as 40 Pa, the particles removing efficiency was very large such as 39% as a matter of course. Also an increase in pressure loss is very slow on dust loading (JIS type 15) until the pressure reaches a final pressure and clogging hardly occurs. Finally, dust could be retained in an amount of 50 g/m². To concretely confirm the actual effect of this sheet, the sheet was formed into a shape of pleats having a filter planar size of 200 mm×180 mm, a filter thickness of 40 mm and a distance between crests of 8 mm, which was further provided with a flame member for fixing end surfaces to make a unit (spread sheet area: 0.36 m²). The unit was installed in a car air-conditioner. As a result, the dust (JIS type 15) retention amount of the unit was 17 g per unit. It is considered that the amount of dust, which is introduced from the outside into the car filter, per year is about 10 g, although it depends on the place. Therefore, its useful life is 1.7 years.

Example 6

The back layer of the deodorizing sheet obtained in Example 3 was laminated with an air-permeable sheet C and then integrated by subjecting to a needle punch processing at a punch density of 50 punch/inch² using a needle punch apparatus. As a result, fuzz hardly occurred and its performance was good and the same as that of Example 3. Deserving special mention, since penetrating proper air holes could be provided throughout this sheet by punch processing, pressure loss was smaller than an integrated value of each measured pressure loss of the deodorizing sheet and film split type erectret fiber layer.

Example 7

The deodorizing sheet obtained in Example 3 was provided with small pores at an average open area of 1.2 mm² and a porosity of 5% by using a needle punch apparatus and the air permeation resistance of the resulting sheet was measured. As a result, pressure loss was drastically reduced to 15 Pa. On the other hand, the deodorizing performance was measured. As a result, the toluene adsorption amount was maintained at 33% based on the weight of the sheet. The sheet was superior in handling properties because the granular activated carbon was not fallen off during use as a filter. Deserving special mention, an increase in pressure loss is very slow on dust (JIS type 15) loading until the pressure reaches a final pressure and clogging hardly occurs. Finally, dust could be retained in an amount of 50 g/m². That is, it is possible to say that low pressure loss and the dust-removing function are further improved with maintaining the deodorizing function.

The results are shown in Table 2.

TABLE 2

| | Sheet configuration | | Characteristics | | | | |
|---|---|---|---|---|---|---|---|
| | Electret fiber | Granular activated carbon-containing deodorizing sheet | Activated carbon amount (g/m²) | Packing density of air-permeable sheet (g/cc) | Pressure loss (Pa) | Particles (0.3 μm) removing efficiency | Dust (JIS type 15) retention amount (g/m²) |
| Example 4 | Film split type electret fiber (30 g/m²) | Activated carbon-containing sheet by wet paper method (using activated carbon having a particle diameter of 310 μm, weight: 350 g/m²) | 250 | 0.06 | 38 | 39 | 50 |
| Example 5 | Film split type electret fiber (30 g/m²) + polyester heat adhesive fiber (10 g/m²) | Activated carbon-containing sheet by wet paper method (using activated carbon having a particle diameter of 130 μm, weight: 170 g/m²) | 120 | 0.1 | 40 | 39 | 50 |
| Example 6 | Film split type electret fiber (30 g/m²) + polypropylene non-woven fabric (15 | Activated carbon-containing sheet by wet paper method (using activated carbon having a particle diameter of | 120 | 0.12 | 33 | 39 | 56 |

TABLE 2-continued

| | Sheet configuration | | Characteristics | | | | |
|---|---|---|---|---|---|---|---|
| Electret fiber | Granular activated carbon-containing deoderizing sheet | Activated carbon amount (g/m$^2$) | Packing density of air-permeable sheet (g/cc) | Pressure loss (Pa) | Particles (0.3 μm) removing efficiency | Dust (JIS type 15) retention amount (g/m$^2$) | |
| g/m$^2$) | 130 μm, weight: 170 g/m$^2$) | | | | | | |

What is claimed is:

1. A gas adsorption sheet comprising:
a granular activated carbon-containing sheet comprising a granular activated carbon having an average particle diameter of 100 to 600 μm, a supporting fiber with a fiber diameter of 15 μm or more for fixing the granular activated carbon in contact with it, and an adhesive fiber which contributes to shape retention and is a water-swelling fiber, wherein the granular activated carbon-containing sheet is integrally formed by wet bonding and has a first surface zone containing supporting fibers and no granular activated carbon on a first surface, and a granular activated carbon-sedimenting zone on a second surface;
and an air-permeable sheet laminated on the second surface.

2. The gas adsorption sheet according to claim 1, wherein the air-permeable sheet in addition to the granular activated carbon-containing sheet.

3. The gas adsorption sheet according to claim 1, wherein the air-permeable sheet comprises a non-woven fabric made of a film split type electret fiber as a main component.

4. The gas adsorption sheet according to claim 3, wherein the air-permeable sheet is further provided with a cover sheet in the form of a non-woven fabric, woven fabric or net.

5. The gas adsorption sheet according to claim 3, wherein a packing density of the air-permeable sheet is from 0.01 to 0.20 g/cc.

6. The gas adsorption sheet according to claim 1, wherein an outer surface area of the supporting fiber is not more than 1 m$^2$/g, a fiber length thereof is from 3 to 20 mm and a density thereof is from 0.8 to 1.7 g/cc.

7. The gas adsorption sheet according to claim 1, wherein the granular activated carbon-containing sheet contains the granular activated carbon in an amount of 30 to 80% by weight based on the total weight thereof.

8. The gas adsorption sheet according to claim 1, wherein the granular activated carbon-containing sheet is provided with small pores that allow air to substantially permeate the carbon-containing sheet in a thickness direction.

9. The gas adsorption sheet according to claim 1, wherein an average open area per one pore of the small pores is from 0.5 to 3 mm$^2$.

10. The gas adsorption sheet according to claim 1, wherein the number of the small pores is from 1 to 20 per cm$^2$ of the granular activated carbon-containing sheet.

11. The gas adsorption sheet according to claim 1, wherein a porosity of the small pores is from 3 to 10%.

12. An air-purifying filter obtained by forming a gas adsorption sheet having a granular activated carbon-containing sheet and an air-permeable sheet into a shape of pleats or wave, said granular activated carbon-containing sheet comprising:
a granular activated carbon having an average particle diameter of 100 to 600 μm, a supporting fiber with a fiber diameter of 15 μm or more for fixing the granular activated carbon in contact with it, and an adhesive fiber which contributes to shape retention and is a water-swelling fiber wherein said granular activated carbon-containing sheet is integrally formed by wet bonding and has small pores that allow air to substantially permeate the carbon-containing sheet in a thickness direction, said granular activated carbon-containing sheet has a surface zone containing supporting fibers and no granular activated carbon on one surface, and a granular activated carbon-sedimenting zone on a second surface, and wherein said air-permeable sheet is laminated on the second surface of the granular activated carbon-containing sheet.

13. An air-purifying filter obtained by forming a gas adsorption sheet having a granular activated carbon-containing sheet and an air-permeable sheet into a shape of pleats of wave, said granular activated carbon-containing sheet comprising:
a granular activated carbon having an average particle diameter of 100 to 600 μm, a supporting fiber with a fiber diameter of 15 μm or more for fixing the granular activated carbon in contact with it, and an adhesive fiber which contributes to shape retention and is a water-swelling fiber, wherein said granular activated carbon-containing sheet is integrally formed by wet bonding and has small pores that allow air to substantially permeate the carbon-containing sheet in a thickness direction, said granular activated carbon-containing sheet has a surface zone containing supporting fibers and no granular activated carbon on one surface, and a granular activated carbon-sedimenting zone on a second surface, and wherein said air-permeable sheet is laminated on the second surface of the granular activated carbon-containing sheet and is provided with a cover sheet in the form of a non-woven fabric, woven fabric, or net.

* * * * *